United States Patent [19]

Pradl et al.

[11] Patent Number: 4,855,378

[45] Date of Patent: Aug. 8, 1989

[54] ORGANOSILICON COMPOUNDS AND CROSSLINKABLE ORGANOPOLYSILOXANE COMPOSITIONS CONTAINING THE ORGANOSILICON COMPOUNDS

[75] Inventors: Ferdinand Pradl; Carlos Weise; Karl-Heinrich Wegehaupt, all of Burghausen, Fed. Rep. of Germany

[73] Assignee: Wacker-Chemie GmbH, Munich, Fed. Rep. of Germany

[21] Appl. No.: 93,264

[22] Filed: Sep. 4, 1987

[30] Foreign Application Priority Data

Sep. 12, 1986 [DE] Fed. Rep. of Germany ....... 3631125

[51] Int. Cl.$^4$ .................. C08G 77/12; C08G 77/40
[52] U.S. Cl. ...................................... 528/26; 528/15; 528/25; 528/31; 528/32; 528/27; 528/28; 524/759; 524/760; 524/772; 524/773
[58] Field of Search ............... 528/15, 31, 32, 25, 528/26; 524/863, 759, 760, 726, 728, 770, 773, 718, 717, 751, 753, 720, 730, 714, 774, 775, 772

[56] References Cited

U.S. PATENT DOCUMENTS

| Re. 32,504 | 9/1987 | Michel et al. | 524/753 |
|---|---|---|---|
| 3,445,420 | 5/1969 | Kookootsedes et al. | 528/15 |
| 3,730,932 | 5/1973 | De Zuba et al. | 528/32 |
| 3,882,083 | 5/1975 | Berger et al. | 528/15 |
| 3,888,815 | 6/1975 | Bessmer et al. | 528/15 |
| 3,941,741 | 3/1976 | De Zuba et al. | 528/32 |
| 4,256,870 | 3/1981 | Eckberg | 528/15 |
| 4,340,170 | 7/1982 | Brown, Jr. | 528/15 |
| 4,347,346 | 8/1982 | Eckberg | 528/32 |
| 4,395,507 | 7/1983 | Dziark et al. | 524/720 |
| 4,426,240 | 1/1984 | Louis et al. | 528/15 |
| 4,463,127 | 7/1984 | Alberts et al. | 528/26 |
| 4,476,166 | 10/1984 | Eckberg | 528/15 |
| 4,504,645 | 3/1985 | Melancon | 528/15 |
| 4,539,357 | 9/1985 | Bobear | 528/32 |
| 4,562,096 | 12/1985 | Lo et al. | 528/15 |
| 4,677,161 | 6/1987 | Suzuki | 528/15 |

Primary Examiner—Lewis T. Jacobs
Assistant Examiner—R. Dean, Jr.

[57] ABSTRACT

Organosilicon compounds and organopolysiloxane compositions which are crosslinked by the addition of Si-bonded hydrogen with SiC-bonded vinyl groups and contain the organosilicon compounds as additives for improving the adhesion of the resultant elastomers on the substrates on which they are formed.

5 Claims, No Drawings

ORGANOSILICON COMPOUNDS AND CROSSLINKABLE ORGANOPOLYSILOXANE COMPOSITIONS CONTAINING THE ORGANOSILICON COMPOUNDS

The present invention relates to organosilicon compounds and particularly to organopolysiloxane compositions containing the organosilicon compounds. More particularly, the invention relates to organopolysiloxane compositions which are crosslinked by the addition of Si-bonded hydrogen to Si-bonded vinyl groups and contain the organosilicon compounds as an additive to improve adhesion of the organopolysiloxane elastomers to substrates on which they are formed.

BACKGROUND OF THE INVENTION

Organopolysiloxane compositons which are crosslinked by the addition of Si-bonded hydrogen to SiC-bonded vinyl groups and which contain an additive for improving the adhesion of the resultant elastomers to substrates on which they have been formed are described, for example, in Canadian Pat. No. 1,180,482 to Keating.

U.S. Pat. No. 3,445,420 to Kookootsedes et al describes a curable composition comprising an olefin containing organosilicon polymer, an organosilicon compound containing silicon-bonded hydrogen atoms, a platinum catalyst and an acetylenic compound as an additive. U.S. Pat. No. 4,256,870 to Eckberg describes a silicon composition comprising a base polymer such as a vinyl endblocked polydialkyl-alkylvinyl polysiloxane base copolymer, a methylhydrogen crosslinking fluid, a platinum metal catalyst and a diallylmaleate as an additive.

U.S. Pat. No. 4,530,989 to Michel et al describes an organopolysiloxane composition containing organosilicon compounds having Si-bonded hydrogen atoms and aliphatic multiple bonds, a platinum catalyst which promotes the addition of Si-bonded hydrogen atoms to the aliphatic multiple bonds and an additive, such as maleinimide or a maleic acid derivative.

None of the references cited above disclose the organosilicon compounds of this invention as additives for organopolysiloxane compositions which are crosslinked by the addition of Si-bonded hydrogen to SiC-bonded vinyl groups to form elastomers. Likewise, none of the above cited references disclose that elastomers containing the organosilicon compounds of the respective inventions will readily adhere to the substrates upon which they are formed.

Therefore, it is an object of the present invention to provide novel organosilicon compounds. Another object of the present invention is to provide organosilicon compounds which are essentially nonvolatile and essentially nontoxic. Another object of the present invention is to provide organopolysiloxane compositions containing the organosilicon compounds as additives. Another object of the present invention is to provide organopolysiloxane elastomers having improved adhesion to various substrates. Still another object of the present invention is to provide organopolysiloxane compositions which are crosslinked by the addition of Si-bonded hydrogen to SiC-bonded vinyl groups and which contain an additive for improving the adhesion of the resultant elastomers to various substrates. A further object of the present invention is to provide organopolysiloxane elastomers which have improved adhesion to various substrates in the absence of primers. A still further object of the present invention is to provide organopolysiloxane compositions which may be crosslinked at temperatures below 80° C. to form elastomers that readily adhere to various substrates in the absence of priming agents. A still further object of the present invention is to provide a process for preparing organopolysiloxane elastomers which contain an organosilicon compound that improves the adhesion of the elastomers to various substrates upon which they are formed.

SUMMARY OF THE INVENTION

The foregoing objects and others which will become apparent from the following description are accomplished in accordance with this invention, generally speaking, by providing organosilicon compounds which may be incorporated as an additive in organopolysiloxane compositions to improve the adhesion of the resultant elastomers to substrates upon which they are formed, in which the organopolysiloxane elastomers are formed by the addition of Si-bonded hydrogen to SiC-bonded vinyl groups.

DESCRIPTION OF THE INVENTION

The organosilicon compounds which are used as an additive in the organopolysiloxane compositions to improve the adhesion of the resultant elastomers to various substrates are selected from the following groups of compounds:

(1) compounds of the formula

in which R represents a monovalent hydrocarbon radical having from 1 to 20 carbon atoms in each radical and Z is the same as R or represents hydrogen or the —OR group, where R is the same as above, in which at least one aliphatic carbon-carbon double bond is present in each molecule and the aliphatic carbon-carbon bonds other than the aliphatic carbon-carbon double bonds are single bonds, and when Z is not hydrogen or does not have the same meaning as R, then the hydrocarbon radical R and/or Z must have at least one substituent selected from the group having the formulas:

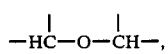

—CN and

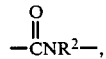

where $R^2$ is hydrogen or a monovalent hydrocarbon radical having from 1 to 20 carbon atoms in each radical, (2) compounds of the formula

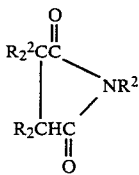  (II)

in which $R^2$ is the same as above, or both $R^2$'s are bonded to the same carbon atom and together represent a hydrocarbon radical which is bonded to the carbon atom via a carbon-carbon double bond, (3) compounds of the formula

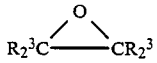  (III)

in which $R^3$ represents hydrogen or the same or different monovalent hydrocarbon radicals, and if they form a ring with one another, are divalent hydrocarbon radicals and may be substituted by at least one substituent which is selected from the group having the formulas:

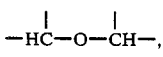

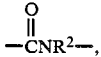

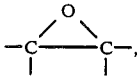

—Cl,
—F,
—Br and
—I, where $R^2$ is the same as above, and at least one carbon-carbon double and/or triple bond is present in each molecule, (4) organosilicon compounds which can be obtained by the hydrosilylation of a triallyl isocyanurate with an organosiloxane of the formula $$H(CH_3)_2Si[OSi(CH_3)_2]_nH$$

where n is an integer having a value of from 1 to 5, (5) silanes of the formula $$(R^5C_mH_{2m})_aSi(OR^4)_{4-a} \quad (IV)$$

in which $R^4$ is the same or different monovalent hydrocarbon radicals having from 1 to 6 carbon atoms in each radical, and $R^5$ is the same or different hydrocarbon radicals having from 1 to 20 carbon atoms in each radical which are substituted by at least one substituent which is selected from the group having the formulas:

—Si(OR$^4$)$_3$

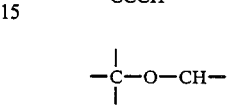

where $R^2$ and $R^4$ are the same as above, a is an integer having a value of from 1 to 3, m is an integer having a value of from 1 to 6, and at least one carbon-carbon double and/or triple bond is present in each molecule, (6) polysiloxanes of the formula

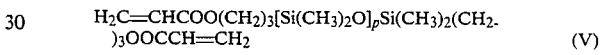

where p is an integer having a value of from 1 to 10, and more preferably a value of from 1 to 4, (7) diallyl dicarboxylates of the formula

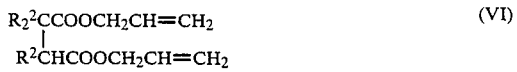

where $R^2$ is the same as above, or both $R^2$'s are bonded to the same carbon atom and together represent a hydrocarbon radical which is bonded to the carbon atom via a carbon-carbon double bond.

The radicals represented by R preferably contain from 1 to 10 carbon atoms in each radical, and the radicals represented by Z preferably contain from 3 to 10 carbon atoms in each radical. The radicals represented by R and Z may be linear, branched or cyclic.

The radicals represented by $R^2$ may also be linear, branched or cyclic.

Preferred examples of compounds represented by formula (I) are allyl esters of monocarboxylic acids having from 2 to 10 carbon atoms in each molecule, in which the esters may be substituted by an ether oxygen, or at least one ketoxy group or by at least one cyano group. Specific examples of compounds represented by formula (I) are allyl p-methoxyphenylacetate of the formula p—CH$_3$OC$_6$H$_4$CH$_2$COOCH$_2$CH=CH$_2$, allyl 3,4-dimethoxyphenylacetate of the formula 3,4-(CH$_3$O)$_2$C$_6$H$_3$CH$_2$COOCH$_2$CH=CH$_2$, allyl cyanoacetate of the formula

NCCH$_2$COOCH$_2$CH=CH$_2$, allyl acetoacetate of the formula

CH₃COCH₂COOCH₂CH=CH₂, and allyl diacetoacetate of the formula (CH₃CO)₂CHCOOCH₂CH=CH₂.

Other examples of compounds represented by formula (I) are aldehydes having at least one aliphatic carbon-carbon double bond, such as crotonaldehyde having the formula

CH₃CH=CHCHO, cinnamaldehyde having the formula

C₆H₅CH=CHCHO, and hexadieneal having the formula

CH₃CH=CHCH=CHCHO.

Examples of ketones having at least one aliphatic carbon-carbon double bond, which are represented by formula (I) are benzalacetone having the formula

CH₃COCH=CHC₆H₅, anisalacetone having the formula

CH₃COCH=CHC₆H₄-p-OCH₃, a compound of the formula

CH₃COCH=CHC₆H₄-o-OH, methyl vinyl ketone having the formula

CH₃COCH=CH₂, mesityl oxide having the formula

CH₃COCH=C(CH₃)₂, and phorone having the formula (CH₃)₂C=CHCOCH=C(CH₃)₂.

An additinal example of a compound represented by formula (I) is

H₂C=CHCONHCH(OCH₃)COOCH₃.

The compounds mentioned above as being examples of formula (I) are all commercially available.

A preferred example of a compound of formula (II) is N-allyl-allylsuccinimide having the formula

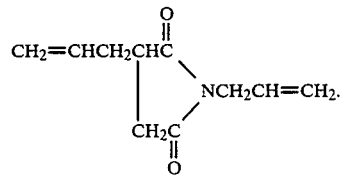

Another example of a compound of formula (II) is a compound having the formula

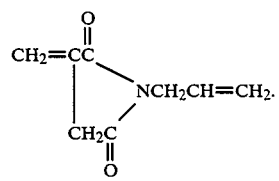

The radicals represented by R³ may also be linear, branched or cyclic. Specific examples of compounds of formula (III) are 4-vinylcyclohexene oxide, having the formula

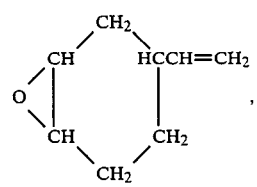

allyl glycidyl ether having the formula

liquid oligomeric epoxides of the formula

in which n' is an integer having a value of from 1 to 15, preferably from 5 to 8, and a compound of the formula

The compounds mentioned above as being examples of compounds of formula (III) are also all commercially available.

Organosilicon compounds which can be obtained from the hydrosilylation of triallylisocyanurate with an organosiloxane of the formula H(CH₃)₂Si[OSi(CH₃)₂]ₙH in which n is an integer having a value of from 1 to 5, are preferably those of the formula

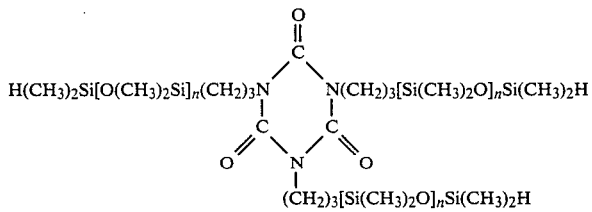

in which n is the same as above. Preferably, n is 1 or 2, and more preferably n is 1.

The radicals represented by $R^4$ and $R^5$ may also be linear, branched or cyclic. Due to their availability, the methyl or ethyl radicals are the preferred radicals for the $R^4$ radical. Also, it is preferred that the $R^5$ radical(s) represent carbon-carbon double or triple bond(s), and more preferably the carbon-carbon double bond(s).

Specific examples of silanes having formula (IV) are those of the formulas

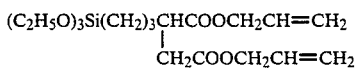  (1)

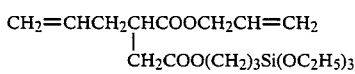  (1a)

and mixtures of these two silanes

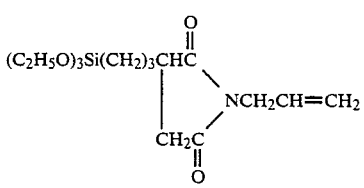  (2)

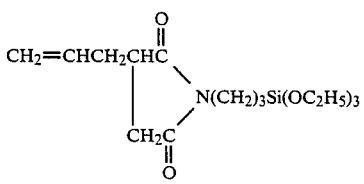  (2a)

and mixtures of these two silanes, $(C_2H_5O)_3Si(CH_2)_3OCH(OCH_2CH=CH_2)CH(OCH_2CH=CH_2)_2$,  (3)

$[(C_2H_5O)_3Si(CH_2)_3O]_2CHCH(OCH_2CH=CH_2)_2$,  (4)

$[(C_2H_5O)_3Si(CH_2)_3O]_2CHCH[O(CH_2)_3Si(OC_2H_5)_3]OCH_2CH=CH_2$  (5)

$H_2C=CHCH_2O[(C_2H_5O)_3Si(CH_2)_3O]CHCH[O(CH_2)_3Si(OC_2H_5)_3]OCH_2CH=CH_2$,  (6)

$(C_2H_5O)_3Si(CH_2)_3OOCCH_2COCH_2CH=CH_2$,  (7)

and silanes of the formula

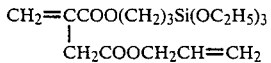  (9)

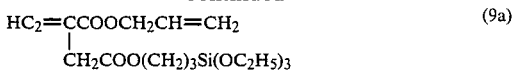  (9a)

and mixtures of these two silanes.

These silanes can be prepared by the addition reaction of compounds of the formula $HSi(OR^4)_3$, in which $R^4$ is the same as above, with compounds of formulas (1) to (7) or (9) in which the group having the formula $(C_2H_5O)_3Si(CH_2)_3-$ is replaced by a group of the formula $H_2C=CHCH_2-$, in a manner which is known, per se. The compounds of formula (V) and their preparation are described in U.S. Pat. No. 4,554,339 to Hockemeyer et al.

Specific examples of diallyl dicarboxylates of formula (VI) are diallyl succinate, diallyl allylsuccinate and diallyl itaconate.

The compositions of this invention contain, in addition to the additives (a), described above for improving the adhesion of the elastomers to the substrates on which they are formed, the same components which have been, or could have been present heretofore, in compositions which have been used in the preparation of organopolysiloxane elastomers and which can be crosslinked by the addition of Si-bonded hydrogen to SiC-bonded vinyl groups. Thus, the essential components of the compositions of this invention, other than additive (a), are:

(b) diorganopolysiloxanes containg SiC-bonded vinyl groups, especially those of the formula $R_2^6(CH_2=CH)SiO(R_2^6SiO)_xSiR_2^6(CH=CH_2)$ where $R^6$ represents the same or different monovalent SiC-bonded organic radicals, which are free of aliphatic carbon-carbon multiple bonds and x represents an integer having a value such that the average viscosity of these diorganopolysiloxanes is from 100 to $10^6$ mPa.s at 25° C., and more preferably from 200 to 200,000 mPa.s at 25° C., (c) compounds containing Si-bonded hydrogen, which are preferably linear, cyclic or branched organopolysiloxanes, containing units of the formula $R_z^6H_ySiO_{\frac{4-y-z}{2}}$ where $R^6$ is the same as above, y is 0 or 1, z is 0, 1, 2 or 3 and the sum of y+z is 1, 2 or 3, with the proviso that at least 2 and preferably at least 3, Si-bonded hydrogen atoms are present in each molecule, and (d) a catalyst which promotes the addition of Si-bonded hydrogen to SiC-bonded vinyl groups.

The $R^6$ radicals which may be linear, branched or cyclic radicals, preferably contain from 1 to 18 carbon atoms each radical. Examples of $R^6$ radicals are monovalent hydrocarbon radicals, such as alkyl radicals, for example the methyl, ethyl, n-propyl, isopropyl, n-butyl and sec-butyl radical, and also octadecyl radicals; cycloalkyl radicals, such as the cyclohexyl radical and methyllcyclohexyl radicals; aryl radicals, such as the phenyl radical; alkaryl radicals, such as tolyl radicals; and aralkyl radicals, such as the benzyl and beta-phenylethyl radicals. These monovalent hydrocarbon radicals may also contain substituents which are inert towards Si-bonded hydrogen. Examples of substituted hydrocarbon radicals are halogenated hydrocarbon radicals, such as the 3,3,3-trifluoropropyl radicals and o-, p- and m-chlorophenyl radicals. Preferably, at least 80 percent of the number of $R^6$ radicals are methyl radicals, because of their availability.

The compounds having Si-bonded hydrogen are present in an amount such that from 0.1 to 15 Si-bonded hydrogen atoms are present per SiC-bonded vinyl group.

Any catalyst which promotes the addition of Si-bonded hydrogen to SiC-bonded vinyl groups, may be used as catalyst (d) in the compositions of this invention. Examples of such catalysts are metallic and finely divided platinum, ruthenium, rhodium, palladium and iridium, which may be supported on solid materials, such as silicon dioxide, aluminum oxide or activated charcoal, and compounds or complexes of these elements, such as $PtCl_4$, $H_2PtCl_6.6H_2O$, $Na_2PtCl_4.4H_2O$, platinum-olefin complexes, platinum-alcohol or platinum-alcoholate complexes, platinum-ether complexes, platinum-aldehyde complexes, platinum-ketone complexes, such as products obtained from the reaction of $H_2PtCl_6.6H_2O$ and cyclohexanone, platinum-vinyl-siloxane complexes, in particular 1,3-divinyl-1,1,3,3-tetramethyldisiloxane complexes with or without detectable, inorganically bonded halogen, bis-(gamma-picoline)-platinum dichloride, trimethylenepyridine-platinum dichloride, dicyclopentadieneplatinum dichloride, (dimethyl sulfoxide)-ethylene-platinum(II) dichloride, the product obtained from the reaction of a solution of platinum tetrachloride in 1-octene with sec-butylamine, tetrakis(triphenyl phosphine)palladium, mixtures of palladium black and triphenyl phosphine, compounds of the formula XPtY, in which X represents hydrocarbon radicals and substituted hydrocarbon radicals having from 1 to 3 aliphatic carbon-carbon double bonds and which is bonded to the platinum atom via a PtC sigma-bond and via a Pt-olefin pi-bond, and Y represents a beta-diketonate ligand which is bonded to the platinum atom as a chelate, (U.S. Pat. No. 4,177,341, Kreis et al), and compounds of the formula

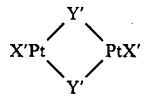

in which X' represents the same or different, alkoxy or acyloxy groups, substituted hydrocarbon radicals having from 1 to 3 aliphatic carbon-carbon double bonds, in which these hydrocarbon radicals are bonded to the platinum atom via a PtC sigma-bond and via a Pt-olefin pi-bond, and Y' represents the same or different divalent bridging ligands (U.S. Pat. No. 4,177,341).

It is possible to use one type of catalyst (d) to promote the addition of Si-bonded hydrogen to SiC-bonded vinyl groups, or a mixture of at least two different types of such catalysts may be used. Likewise, it is possible to use only one type of component (a), or a mixture of at least two different types of component (a), may be used in the compositions of this invention. In regard to component (b), only one type of component (b) need be employed, or a mixture of at least two different types of component (b) may be employed in the present invention. Only one type of component (c) need be employed; however, a mixture consisting of at least two different types of component (c) may be employed, in the compositions used in the process of this invention.

When platinum, a platinum compound or a platinum complex is employed as the catalyst in the present invention to promote the addition of Si-bonded hydrogen to SiC-bonded vinyl groups, such a catalyst is preferably used in an amount of from 5 to 50 ppm (parts per million by weight), calculated as the element and based on the total weight of components (b) and (c).

The additive (a) used in accordance with the present invention is preferably employed in an amount of from 0.01 to 10 percent by weight, preferably from 0.2 to 5 percent by weight, based on the total weight of components (b) and (c). If the amount of additive (a) is less than 0.01 percent by weight, based on the total weight of components (b) and (c), the adhesion of the elastomers to the substrates on which they are formed may be unacceptable. If the amount of the additive (a) is more than 10 percent by weight, based on the total weight of components (b) and (c), the crosslinking rate of the compositions may be reduced to an unacceptable level. The amount of additive (a) used in accordance with this invention can easily be determined by those skilled in the art by simple experimentation.

In addition to the organopolysiloxane (b) containing SiC-bonded vinyl groups, an organosilicon compound (c) containing Si-bonded hydrogen, a catalyst (d) which promotes the addition of Si-bonded hydrogen to SiC-bonded vinyl groups, and the additive (a), other substances which have been or could have been used heretofore in preparing compositions which can be crosslinked by the addition of Si-bonded hydrogen to SiC-bonded vinyl groups to form elastomers may be used in the compositions of this invention. Examples of such additional substances are inorganic fillers having a BET surface area of at least 50 m$^2$/g, such as pyrogenically produced silicon dioxide or precipitated silicon dioxide having a BET surface area of at least 50 m$^2$/g, inorganic fillers having a surface area of less than 50 m$^2$/g, such as quartz powder, glass fibers, precipitated silicon dioxide having a BET surface area of less than 50 m$^2$/g or diatomaceous earth, electroconductive substances, such as acetylene black, pigments, soluble dyestuffs, plasticizers, organopolysiloxane resins, such as those obtained from units of the formula $(H_2C=CH)R_2^6SiO_{\frac{1}{2}}$, $R_3^6SiO_{\frac{1}{2}}$ and $SiO_{4/2}$, where $R^6$ is the same as above, organic resins, such as polyvinyl chloride powder, agents, other than additive (a) which may be used to improve the adhesion of elastomers to substrates on which they have been formed and agents which regulate or retard crosslinking, such as monoallyl maleate, 1-ethynlcyclohexan-1-ol, benzotriazoles or 1,3-divinyl-1,1,3,3-tetramethyldisiloxane.

At least part of the inorganic fillers having a BET surface area of at least 50 m²/g and/or the inorganic fillers having a BET surface area of less than 50 m²/g may be rendered hydrophobic by treating the fillers with, for example, hexamethyldisilazane in the presence or absence of component (b) and/or component (c).

The compositions which are used in the process of this invention and which can be crosslinked by the addition of Si-bonded hydrogen to SiC-bonded vinyl groups can be prepared by conventional methods for preparing compositions which can be crosslinked by the addition of Si-bonded hydrogen to SiC-bonded vinyl groups. If the crosslinkable compositions which are employed in the processes of the present invention are prepared from more than one part, as is very frequently the case in compositions which can be crosslinked at room temperature, generally one part contains component (b) and component (d), and another part contains component (c), or component (d) may be added as a third part of the composition. The addition of component (a) is not critical and may be added to any part of the composition, or it may be incorporated into a mixture of all the other components, as long as this mixture does not crosslink too rapidly.

In the process of this invention, the crosslinking is preferably carried out at temperatures of from 15° to 250° C., and more preferably at temperatures of from 80° to 160° C.

Examples of substrates on which the elastomeric compositions of this invention will adhere in the absence of priming agents are silicate substances, such as porcelain, earthenware, enamel and glass, metals, such as steel, aluminum and copper, and also wood and plastics, such as polyvinyl chloride, polycarbonates and glass fiber-reinforced epoxy resins.

The elastomeric compositions of the present invention are suitable, for example, for casting or embedding, for example, electrical or electronic or photo-voltaic components; for sealing; for producing coatings; for bonding, for example during the bonding of glass sheets or plastic sheets to one another, and for the insulation of electrical conductors.

In the following examples, all parts and percentages are by weight, unless otherwise specified. All viscosities are measured at 23° C.

(a) Preparation of diallyl allylsuccinate

A mixture containing 175 g (1.25 mol) of allylsuccininc anhydride, 250 g (4.3 mol) of allyl alcohol, 250 ml of chloroform and 12 g of p-toluene sulfonic acid is refluxed with stirring in a round-bottomed flask equipped with a stirrer, reflux condenser and water separator until 22 ml of water have separated out. After cooling, the contents of the flask are washed in a separating funnel, first with water, then with a 5 percent aqueous sodium bicarbonate solution and then with water, and dried over magnesium sulfate. After filtering off the drying agent, the solvent and excess allyl alcohol are removed at 15 hPa (abs.). About 234 g of diallyl allylsuccinate boiling at a temperature of from 69° to 70° C. at 1.3 hPa (abs.) are obtained from the residue by distillation.

(b) Preparation of N-allyl-allylsuccinimide

About 140 g (1 mol) of allylsuccinic anhydride and 250 ml of diethyl ether which has been dried over metallic sodium are placed under nitrogen in a round-bottomed flask equipped with a stirrer, dropping funnel and reflux condenser, and then mixed with 75 g (0.95 mol) of pyridine. About 57 g of allylamine in 100 ml of diethyl ether which has been dried over metallic sodium are then added dropwise to the flask with stirring over a period of 2 hours. When the addition is complete, the mixture is refluxed for an additional 1 hour. The resultant mixture is washed in a separating funnel with 5 percent aqueous hydrochloric acid until the pH of the aqueous phase is 6.5. The organic phase is dried over magnesium sulfate. After filtering off the drying agent, the solvent is removed at 15 hPa (abs.). About 153 g of N-allyl-allylsuccinimide, which boils at 130° C. at 0.5 hPa, are obtained from the residue by distillation.

(c) Preparation of a mixture of silanes

A silane mixture containing a silane of the formula

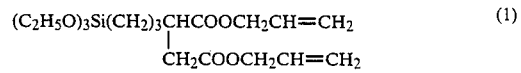
(1)

and a silane of the formula

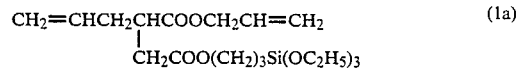
(1a)

is prepared by adding 69 g (0.42 mol) of triethoxysilane in 1000 ml of toluene dropwise over a period of 4 hours with agitation to a mixture heated to 100° C. containing 100 g (0.42 mol) of diallyl allylsuccinate, 1000 ml of toluene and 0.8 ml of a solution containing 1 percent platinum, calculated as the element, of dicyclopentadieneplatinum dichloride in dichloromethane in a round-bottomed flask equipped with a stirrer, thermometer, dropping funnel and reflux condenser. The temperature of the flask is maintained at 100° C. during the addition. The mixture thus obtained is heated at 100° C. for an additional one hour, then cooled to 70° C., mixed with 0.1 g of activated charcoal and stirred at 70° C. for one hour. After filtering off the charcoal, the solvent is removed at 15 hPa (abs.). About 95 g of a mixture, boiling at 114° C. at 1.3 hPa (abs.), and containing 1 part of the silane formula (1) and 2 parts of the silane of formula (1a) are obtained from the residue by distillation.

(d) Preparation of a mixture of silanes

A mixture containing a silane of the formula

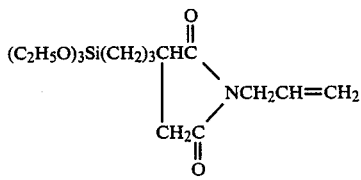 (2)

and a silane of the formula

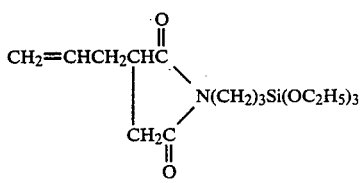 (2a)

is prepared by the procedure described in (c) above, except that 89 g (0.5 mol) of N-allyl-allyl-succinimide are substituted for 100 g of diallyl allylsuccinate, and 82 g (0.5 mol) of triethoxysilane are substituted for 69 g of triethoxysilane. About 148 g of a mixture containing about 1.5 parts of the silane of formula (2) and about 1 part of a silane of formula (2a) are obtained.

(e) Preparation of a silane of the formula $$(C_2H_5O)_3Si(CH_2)_3OCH(OCH_2CH=CH_2)CH(OCH_2CH=CH_3)_2 \quad (3)$$

The procedure described in (c) above is repeated, except that 127 g (0.5 mol) of tetraallyloxyethane are substituted for 100 g of diallyl allyl succinate, and 82 g (0.5) mol of triethoxysilane are substituted for the 69 g of triethoxysilane. About 150 g of the compound of formula (3) are obtained.

(f) Preparation of a silane of the formula $$[(C_2H_5O)_3Si(CH_2)_3O]_2CHCH[O(CH_2)_3Si(OC_2H_5)_3]OCH_2CH=CH_2 \quad (5)$$

The procedure described in (c) above is repeated, except that 127 g (0.5 mol) of tetraallyloxyethane are substituted for the 100 g of diallyl allylsuccinate, and 246 g (1.5 mol) of triethoxysilane are substituted for the 69 g of triethoxysilane. About 359 g of the compound of formula (5) are obtained.

(g) Preparation of a mixture of silanes

A mixture containing a silane of the formula $$[(C_2H_5O)_3Si(CH_2)_3O]_2CHCH(OCH_2CH=CH_2)_2 \quad (4)$$

and a silane of the formula $$H_2C=CHCH_2O[((C_2H_5O)_3Si(CH_2)_3O]CHCH[O(CH_2)_3Si(OC_2H_5)_3-OCH_2CH=CH_2 \quad (6)$$

is prepared by the procedure described in (c) above, except that 127 g (0.5 mol) of tetraallyloxyethane are substituted for the 100 g of diallyl allylsuccinate and 164 g (1 mol) of triethoxysilane are substituted for the 69 g of triethoxysilane. About 276 g of a mixture of silanes of formulas (5) and (6) are obtained.

(h) Preparation of a siloxane of the formula

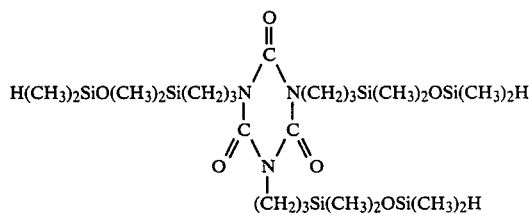 (8)

About 126 g (0.5 mol) of triallyl isocyanurate in 1000 ml of toluene are added dropwise with agitation over a period of about 5 hours to a mixture heated to 110° C. containing 400 g (3 mol) of 1,1,3,3-tetramethyldisiloxane, 500 ml of toluene and 2 ml of a solution containing 1 percent of platinum, calculated as the element, of dicyclopentadieneplatinum dichloride in dichloromethane in a round-bottomed flask equipped with a stirrer, thermometer, dropping funnel and reflux condenser. The resultant solution is heated at 110° C. for an additional one hour, then cooled to 70° C., mixed with 0.01 g of activated charcoal and stirred at 70° C. for one hour. After filtering off the charcoal, the toluene is removed at 2 hPa (abs.). About 315 g of a siloxane of formula (8) is recovered as residue.

(i) Preparation of diallyl itaconate

The procedure described in (a) above is repeated, except that 140 g (1.25 mol) of itaconic anhydride are substituted for the 175 g of allylsuccinic anhydride. About 190 g of diallyl itaconate having a boiling point of 95° C. at 2 hPa (abs.) are recovered.

(k) Preparation of a mixture of silanes

A mixture containing a silane of the formula $$\begin{array}{l}CH_2=CCOO(CH_2)_3Si(OC_2H_5)_3 \\ | \\ CH_2COOCH_2CH=CH_2\end{array} \quad (9)$$

and a silane of the formula $$\begin{array}{l}CH_2=CCOOCH_2CH=CH_2 \\ | \\ CH_2COO(CH_2)_3Si(OC_2H_5)_3\end{array} \quad (9a)$$

is prepared by the procedure described in (c) above, except that 88 g (0.42 mol) of diallyl itaconate are substituted for the 100 g of diallyl allylsuccinate. About 110 g of a mixture boiling at 129° C. at 2 hPa (abs.) and containing 1 part of a silane of formula (9) and one part of a silane of formula (9a) are obtained.

(1) Preparation of a mixture containing a platinum complex and diluent

About 20 parts of sodium bicarbonate are added to a mixture containing 10 parts of $H_2PtCl_6.6H_2O$, 20 parts of 1,3-divinyl-1,1,3,3-tetramethyldisiloxane and 50 parts of ethanol. The resultant mixture is refluxed for 30 minutes with stirring, then allowed to stand for 15 hours and then filtered. The components boiling up to 80° C. at 15 hPa (abs.) are removed from the filtrate by distillation. The residue is dissolved in benzene. The solution is filtered and benzene is removed from the filtrate by distillation. The residue is dissolved in a dimethylpolysiloxane having terminal vinyldimethylsiloxy groups and having a viscosity of 1400 mPa.s in an amount such that the solution contains 1 percent of platinum, calculated as the element.

EXAMPLE 1

About 90 parts of a dimethylpolysiloxane having terminal vinyldimethylsiloxy groups and having a viscosity of 1000 mPa.s, as component (b) are initially mixed with 0.3 part of 1,3-divinyl-1,1,3,3-tetramethyldisiloxane, then with 0.3 part of the platinum complex and diluent mixture, as component (d), then with 10 parts of a copolyme containing dimethylsiloxane, methylhydrogen siloxane and trimethylsiloxane units, in which the molar ratio of dimethylsiloxane units to methylhydrogensiloxane units is 4:1 and having a viscosity of 40 mPa.s, as component (c), and finally with 2 parts each of the additives (a) listed in Table 1 to improve the adhesion of the elastomers to the substrates on which they are formed. Samples of the compositions described above are applied to the substrates listed in Table 1, after the substrates had been previously degreased using solvents, and crosslinked on these substrates by heating at 150° C. for 1 hour. The adhesion of the elastomers to the substrates on which they have been formed is tested by attempting to remove the elastomers from the substrates.

TABLE 1

| Substrate | Additive (a) | | | | |
|---|---|---|---|---|---|
| | None | (1) | (2) | (3) | (4) |
| Glass | − | + | − | + | + |
| Stainless steel (V$_2$A) | − | + | + | + | + |
| Aluminum | − | + | + | + | + |
| Copper | − | + | + | + | + |
| Hard polyvinyl chloride | − | + | + | + | + |
| Polycarbonate | − | − | − | − | + |
| Glass fiber-reinforced epoxy resin | − | + | + | + | + |

(1) Allyl diacetoacetate
(2) Liquid oligomeric epoxide of the formula

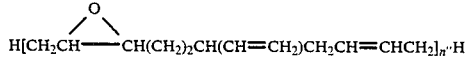

H[CH$_2$CH——CH(CH$_2$)$_2$CH(CH=CH$_2$)CH$_2$CH=CHCH$_2$]$_{n''}$H n" = 5 to 8
(3) Organosiloxane which has been prepared in accordance with the procedure described in (h) above.
(4) Silane mixture which has been prepared in accordance with the procedure described in (d) above.

The symbols used in the above table have the following definition:
+ = good adhesion = cohesive failure (tear in the elastomer)
φ = moderate adhesion = cohesive failure and adhesive failure (tear in the elastomer and separation from the substrate)
− = poor adhesion = adhesive failure (separation from the substrate)

EXAMPLE 2

About 70 parts of a dimethylpolysiloxane having terminal vinyldimethylsiloxy groups and having a viscosity of 15,000 mPa.s, as component (b) are mixed with 30 parts of a benzene-soluble organopolysiloxane resin comprising 55 mole percent of SiO$_{4/2}$ units, 6 mole percent of vinyldimethylsiloxane units and 39 mole percent of trimethylsiloxane units, then with 0.3 part of the platinum complex and diluent mixture, as component (d), then with 10 parts of a copolymer containing dimethylsiloxane, methylhydrogensiloxane and trimethylsiloxane units having dimethylsiloxane units and methylhydrogensiloxane units in a molar ratio of 2:1 and a viscosity of 50 mPa.s, as component (c), and finally with 1 or 2 parts of the additives (a) shown in Table 2. The resultant compositions which can be crosslinked to form elastomers, are further treated in accordance with the procedure of Example 1. The results are shown in Table 2.

TABLE 2

| Substrate | Additive (a) | | | | |
|---|---|---|---|---|---|
| | None | (1) | (2) | (3) | (4) |
| Glass | − | + | + | + | + |
| Stainless steel (V$_2$A) | − | + | + | + | + |
| Aluminum | − | + | + | + | + |
| Copper | − | + | + | + | + |
| Hard polyvinyl chloride | − | φ | + | + | + |
| Polycarbonate | − | + | + | + | − |
| Glass fiber-reinforced epoxy resin | − | + | + | + | + |

(1) 2 parts of allyl diacetoacetate
(2) 2 parts of liquid oligomeric epoxide of the formula given in (2) of Table 1
(3) 1 part of diallyl allylsuccinate
(4) 1 part of the silane mixture prepared in accordance with the procedure described in (c) above.

EXAMPLE 3

About 100 parts of a dimethylpolysiloxane having terminal vinyldimethylsiloxy groups and having a viscosity of 5000 mPa.s, as component (b) are mixed first with 0.5 part of 1,3-divinyl-1,1,3,3-tetramethyldisiloxane, then with 30 parts of a pyrogenically produced silicon dioxide which has been treated with dimethyldichlorosilane to impart hydrophobic properties thereto and having a BET surface area of 200 m$^2$/g, then with 20 g of quartz powder having an average particle size of 10 microns, and then with 0.3 part of the platinum complex and diluent mixture, as component (d). About 90 parts of the mixture thus obtained are mixed first with 10 parts of a mixture containing 6 parts of the copolymer described in Example 1 and having Si-bonded hydrogen as component (c) and 4 parts of the dimethylpolysiloxane having terminal vinyldimethylsiloxy groups and having a viscosity of 5000 mPa.s as a part of component (b), and finally with 1 to 2 parts of the additive (a) listed in Table 3. The resultant compositions are then treated in accordance with the procedure in Example 1. The results are shown in Table 3.

TABLE 3

| Substrate | Additive (a) | | | | | | | |
|---|---|---|---|---|---|---|---|---|
| | None | (1) | (2) | (3) | (4) | (5) | (6) | (7) |
| Glass | − | + | φ | + | + | + | + | − |
| Stainless steel (V$_2$A) | − | + | + | + | + | + | + | − |
| Aluminum | − | + | + | + | + | + | + | − |
| Copper | − | + | + | + | + | + | + | − |
| Hard polyvinyl chloride | − | + | − | + | + | + | + | − |
| Polycarbonate | − | − | + | − | − | − | + | − |
| Glass fiber- | − | + | + | + | + | + | + | + |

TABLE 3-continued

| | Additive (a) | | | | | | | |
|---|---|---|---|---|---|---|---|---|
| Substrate | None | (1) | (2) | (3) | (4) | (5) | (6) | (7) |
| reinforced epoxy resin | | | | | | | | |

(1) 2 parts of allyl diacetoacetate
(2) 1 part of N—allyl-allylsuccinimide
(3) 2 parts of 4-vinylcyclohexene oxide
(4) 2 parts of liquid oligomeric epoxide of the formula

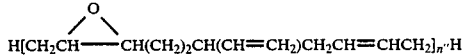

$n'' = 5$ to $8$ (5) 1 part of the organosilane which has been prepared in accordance with the procedure described in (e) above.
(6) 2 parts of an organopolysiloxane of the formula $H_2C=CHCOO(CH_2)_3[Si(CH_3)_2O]_2Si(CH_3)_2(CH_2)_3OOCCH=CH_2$.

In a comparison example, 2 parts of an organosiloxane of the formula $H_2C=C(CH_3)COO(CH_2)_3Si(CH_3)_2OSi(CH_3)_2(CH_2)_3OOCC(CH_3)=CH_2$ which is described in Canadian Patent No. 1,180,482 was substituted for additive (a) in the composition and applied to the substrates. The results of the comparison example are shown in column (7) of Table 3.

EXAMPLE 4

The procedure described in Example 3 is repeated, except that compositions are crosslinked on the substrates at 23° C. and then tested 7 days after application for adhesion, instead of heating the compositions for 1 hour on the substrates and then testing the adhesion of the elastomers to the substrates on which they have been formed more or less immediately after cooling the elastomers to room temperature.

The results are shown in Table 4.

TABLE 4

| | Additive (a) | | |
|---|---|---|---|
| Substrate | None | (1) | (2) |
| Glass | − | + | + |
| Stainless steel (V₂A) | − | + | + |
| Aluminum | − | − | + |

(1) 2 parts of allyl p-methoxyphenylacetate
(2) 2 parts of allyl diacetoacetate

What is claimed is:

1. An organopolysiloxane composition which is crosslinked by the addition of Si-bonded hydrogen to SiC-bonded vinyl groups to form organopolysiloxane elastomers which comprises a diorganopolysiloxane containing SiC-bonded vinyl groups, a compound containing Si-bonded hydrogen, a catalyst which promotes the addition of Si-bonded hydrogen to SiC-bonded vinyl groups and a compound selected from the group consisting of an allyl-3,4-dimethyoxyphenyl acetate, allyl cyanoacetate, allyl acetoacetate, allyl diacetoacetate and an allyl p-methoxyphenylacetate.

2. The composition of claim 1, wherein the compound is present in the organopolysiloxane composition in an amount of from 0.01 to 10 percent by weight, based on the total weight of the organopolysiloxane containing Si-bonded hydrogen and the diorganopolysiloxane containing SiC-bonded vinyl groups.

3. The composition of claim 1, wherein the compound is allyl-3,4-dimethoxyphenyl acetate.

4. The composition of claim 1, wherein the compound is allyl cyanoacetate.

5. The composition of claim 1, wherein the compound is allyl acetoacetate.

* * * * *